Nov. 30, 1943.   H. PANISSIDI   2,335,787
METER CONSTRUCTION
Filed Jan. 27, 1943
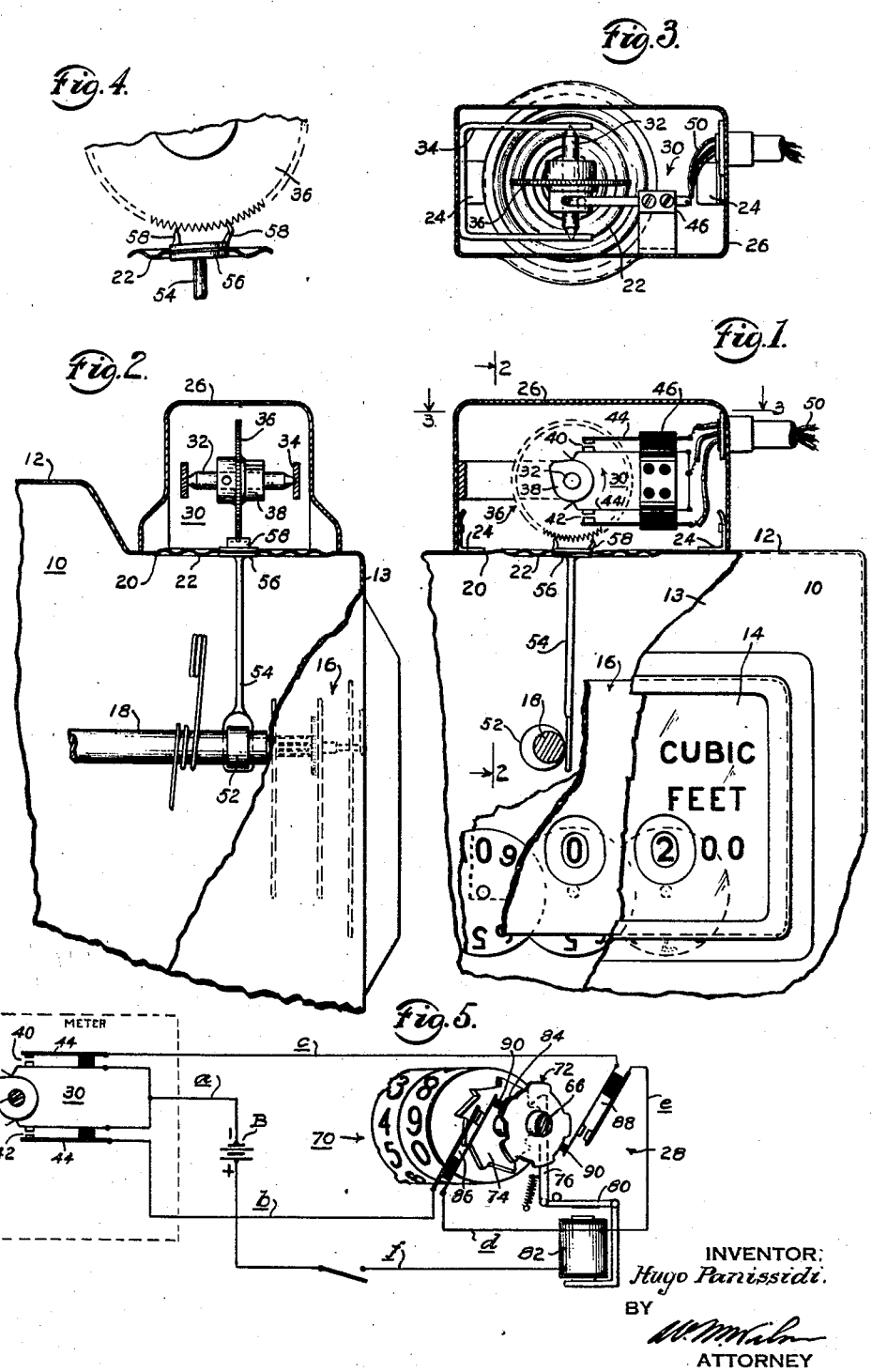
INVENTOR:
Hugo Panissidi.
BY
ATTORNEY Patented Nov. 30, 1943

2,335,787

UNITED STATES PATENT OFFICE 2,335,787

METER CONSTRUCTION

Hugo Panissidi, Jamaica, N. Y., assignor to International Business Machines Corporation, New York, N. Y., a corporation of New York Application January 27, 1943, Serial No. 473,727

2 Claims. (Cl. 74—125)

The present invention relates to apparatus whereby mechanical motion may be transmitted from the inside of an hermetically sealed container, as, for example, the present-day gas or other fluid meter, to an auxiliary apparatus, which is not necessarily sealed or air-tight. From the auxiliary apparatus the mechanical motion thus produced may be utilized to operate a circuit maker and breaker mechanism, whereby impulses may be sent to a remote point for telemetering purposes. The invention is useful in connection with telemetering systems wherein an auxiliary indicating device or register is electrically operated at a remote point under the influence of impulses generated at the meter.

Heretofore, installation within the meter box or casing of telemetering appliances, such as signal sending instrumentalities, registers and the like, has been attended by numerous difficulties, among the more serious being the objection that since telemetering systems are essentially electrical in their operation, there is the ever present danger of accidental igniting of the combustible gas by means of an electric spark. Apart from this serious objection to the use of internal electrical contacts within the meter housing, numerous mechanical difficulties are also encountered, principal among these being the inability to maintain the system gas- and air-tight so that air will not infiltrate into the system and so that gas will not escape therefrom.

The present invention is designed to overcome the above noted limitations that are attendant upon the installation and use of telemetering apparatus in connection with gas meters, and, toward this end, the invention contemplates the provision of the means whereby the internal mechanical instrumentalities that operate to drive the usual meter register are also caused to drive a circuit maker and breaker located exteriorly of the meter housing, while at the same time the system is maintained air-tight and sealed against leaks. The circuit maker and breaker mechanism operates to close various circuits and transmit impulses to a remote point, at which point any suitable telemetering appliances, such as, for example, an electromagnetically operated register, may be controlled. The provision of such an apparatus being the principal object of the invention, an equally important object thereof is to provide a meter construction, including a telemetering unit, wherein no electrical wires, contacts, or other parts, which carry electrical current, are introduced into or exist within the meter housing proper.

Another object of the invention is to provide an apparatus of the character set forth above which is extremely simple in its construction and which is comprised of a minimum number of movable parts and which, at the same time, is rugged and durable and consequently is unlikely to get out of order.

The provision of a telemetering unit which may constitute a permanent part of the original meter construction and which, as such, may originally be built thereinto, or which may, if desired, be adapted for use as an attachment to existing meters with a minimum expenditure of effort, is a further object that has been borne in mind in the production and development of the present invention.

Other objects and advantages of the invention will become more readily apparent as the following description ensues.

In the accompanying single sheet of drawings:

Fig. 1 is a fragmentary front elevational view of a meter construction to which the improved meter take-off mechanism has been applied. In this view, certain parts have been broken away to more clearly reveal the nature of the invention.

Fig. 2 is a sectional view taken substantially along the line 2—2 of Fig. 1.

Fig. 3 is a sectional view taken substantially along the line 3—3 of Fig. 1.

Fig. 4 is an enlarged fragmentary detailed side elevational view of a palette ratchet drive mechanism employed in connection with the present invention, and Fig. 5 is a schematic view showing the electrical connections employed in connection with the telemetering system of the present invention.

In all of the above described views like characters of reference are employed to designate like parts throughout.

Referring now to the drawing in detail, the gas meter involves in its general organization a gas- and air-tight casing 10 having a top wall 12 and a front wall 13, provided with a glass window 14, through which the usual meter dial assembly or indicating device 16 is visible for meter reading purposes. The indicating device 16 is adapted to render a visual indication of the volume consumption of the metered product which, in the present instance, is gas. This indicating device 16 is more or less conventional in design and no claim is made herein to any novelty associated with the same. The indicating device or assembly 16 is adapted to be driven by means of the usual meter drive shaft 18, which is horizontally disposed within the meter casing 10 and around which there extends the usual silent reverse stop mechanism for preventing reversing of the meter.

The arrangement of parts thus far described is purely conventional and no claim is made herein to any novelty associated with the same, the novelty of this invention residing rather in the various construction, combination and arrangement of parts, which will now be more fully set forth.

The top wall 12 of the casing 10 is formed with an opening 20 across which there extends, in sealing relationship, a flexible metallic diaphragm 22. Positioned over the diaphragm 22 and suitably secured to the meter casing 10, by means of angle pieces 24, is an auxiliary casing 26 in which there is disposed the telemetering take-off mechanism, by means of which signal impulses are transmitted to a remotely disposed auxiliary register 70 (see Fig. 5). The telemetering instrumentalities within the casing 26 include a circuit maker and breaker mechanism designated generally at 30 and including a horizontally disposed shaft 32, the ends of which are rotatably mounted in bearings 34 suitably supported within the casing 26. A ratchet wheel 36, having one-hundred teeth thereon, is mounted for rotation with the shaft 32 and a circuit making and breaking cam 38 is positioned on the shaft 32 adjacent the ratchet wheel 36. The cam 38 is adapted upon rotation of the shaft 32 to alternately close two pairs of normally open contacts 40 and 42, by means of which impulses are transmitted over a telemetering circuit to the operating mechanism 28 for the register 70. The contacts 40 and 42 are mounted upon respective arms 44 carried by an insulating block 46 bolted or otherwise secured to the casing 26. A plurality of signaling channels 50 lead from the various arms 44 of the circuit maker and breaker mechanism to the register operating mechanism shown in Fig. 5.

A palette drive mechanism is provided for transmitting motion from the interior of the casing 10 to the circuit maker and breaker mechanism 30 and, toward this end, the usual meter drive shaft 18 has mounted thereon a rotary operating cam 52 which cooperates with a rocker arm 54 suspended from a palette 56 secured to the diaphragm 22 in sealing relationship therewith. The palette 56 includes a pair of palette teeth or fingers 58 designed for cooperation with the teeth of the ratchet wheel 36 in a well-known manner in order to drive the same. The diaphragm 22 forms the sole supporting means for the palette 56 and its depending rocker arm 54 and the tension of the diaphragm 22 is such that the teeth 58 of the palette 56 are at all times maintained in engagement with the toothed periphery of the ratchet wheel 36. Because of the driving relationship which exists between the palette 56 and the ratchet wheel 36, it will be seen that upon rotation of the shaft 18 the cam 52 will impart a swinging or rocking motion to the palette stem or rod 54 which will, in turn, cause rocking movement of the palette 56 so that the ratchet wheel 36 may be rotated.

In the actual assembly of the telemetering device, thus far described, the opening 20 is formed in the cover of the meter casing and the diaphragm 22 is secured to the rim of the opening in such a manner that the diaphragm is taut and does not sag. The casing 26 may then be spot-welded or otherwise secured to the angle pieces 24 and so centered over the opening 20 that the teeth 58 of the palette will register with the teeth of the ratchet wheel 36 in the proper manner, so that the two parts are in driving relationship. The top wall 12 of the meter casing 10 is then soldered in position by a deep-well type of soldering operation in the usual manner of meter construction.

Referring now to Fig. 5, the circuit making and breaking mechanism 30, contained within the casing 26, may be used in any one of a number of well-known telemetering circuits. However, for purposes of illustration, this circuit maker and breaker mechanism has been employed to alternately close two electrical circuits leading to the auxiliary register mechanism 28 located at a point remote from the meter proper. The auxiliary register mechanism 28 includes a cam disc 72 and a ratchet wheel 74 mounted upon the central axial shaft 66 of the cyclometer register. The ratchet wheel 74 is designed for cooperation with a pawl 76 carried by the armature 80 of a relay solenoid 82. The action of the relay 82 is such that each time it receives an impulse the armature 80 is attracted and the cyclometer is advanced or stepped up one indication at a time in a manner common to such assembly. The periphery of the cam disc 72 is provided with a plurality of protuberances 84. A pair of contact assemblies 86 and 88 respectively, each having normally open contacts associated therewith, are provided with followers 90 which ride upon the peripheries of the disc 72 and operate to close the respective contacts of the unit in which they are contained each time one of the protuberances 84 encounters one of the followers 90 of one unit. The two units 86 and 88 are so disposed relative to the cam disc 72 that each time the followers 90 of one unit rides outwardly on the periphery of the disc 72, the other follower rides inwardly thereon, and thus the two pairs of contacts 86 and 88 are caused to close alternately in succession.

The two pairs of contacts 40 and 42 are connected together in common and to the negative side of a battery B by means of a lead wire *a*. The pair of contacts 42 is also connected by a lead wire *b* in series with the contacts 86. The other pair of contacts 40 is connected by a lead wire *c* in series with the contacts 88. The contacts 86 and 88 are both connected to one terminal of the solenoid 82 by means of lead wires *d* and *e* respectively, and the other terminal of the magnet is connected to the positive side of the battery B by means of a lead wire *f*.

In the operation of the apparatus, as the cam 38 rotates, in accordance with the gas consumption indicated by the meter indicating device 16, the pairs of contacts 40 and 42 will alternately become closed and impulses will be applied to the solenoid 82 to advance the cyclometer register 70 one step for each impulse. Immediately thereafter, one or the other pairs of contacts 86 or 88, as the case may be, will become opened to break the circuit through the solenoid 82 and the other pair of contacts will become closed to close a circuit and permit reception of the next impulse. Because of the fact that the first pair of impulse receiving contacts in the register mechanism 28 become open immediately after receiving an impulse, additional impulses applied to the circuit, as, for example, when current interruptions are encountered, will fail to actuate the solenoid 82. Furthermore, because of the fact that one or the other of the pairs of contacts 86 and 88 serves to open the circuits which are closed by the contacts 42 and 40 respectively, arcing at the delicate contacts 40 and 42 will be prevented.

The invention is not to be limited to the exact arrangement of parts shown in the accompanying drawing or described in this specification as various changes in the details of construction may be resorted to without departing from the spirit of the invention. Only insofar as the invention has been particularly pointed out in the accompanying claims is the same to be limited.

What is claimed is:

1. A take-off device for transmitting mechanical rotary motion from the inside of a sealed casing to the outside thereof comprising a rotary member within the casing, an eccentric cam carried by said member, there being an opening in said casing, a flexible diaphragm disposed in said opening and sealing the same, a rotary member disposed outside of said casing having ratchet teeth thereon, a palette secured to the diaphragm and cooperating in driving relationship with said teeth, and a palette stem on said palette projecting inwardly of the casing and normally and continually bearing against said eccentric cam and adapted to be oscillated thereby.

2. A take-off device for transmitting mechanical rotary motion from the inside of a sealed casing to the outside thereof, comprising a rotary member within the casing, an eccentric cam carried by said member, there being an opening in said casing, a flexible diaphragm disposed in said opening and sealing the same, a rotary disc disposed outside of said casing and having ratchet teeth formed thereon, a palette secured centrally to said diaphragm and cooperating in driving relationship with said teeth, a palette stem on said palette projected inwardly of said casing and bearing against said eccentric cam and adapted to be oscillated thereby, said diaphragm forming the sole support for said palette and stem.

HUGO PANISSIDI.